(12) United States Patent
Unseld et al.

(10) Patent No.: US 6,923,450 B2
(45) Date of Patent: Aug. 2, 2005

(54) MULTI-LAYERED STEEL GASKET

(75) Inventors: Günther Unseld, Neenstetten (DE); Josef Ludwig, Niederstotzingen (DE)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/399,011

(22) PCT Filed: Oct. 11, 2001

(86) PCT No.: PCT/EP01/11745

§ 371 (c)(1), (2), (4) Date: Jul. 31, 2003

(87) PCT Pub. No.: WO02/36996

PCT Pub. Date: May 10, 2002

(65) Prior Publication Data

US 2004/0012154 A1 Jan. 22, 2004

(30) Foreign Application Priority Data

Oct. 12, 2000 (DE) .......................... 100 50 478

(51) Int. Cl.$^7$ ................................ F02F 11/00
(52) U.S. Cl. .................. 277/592; 277/593; 277/595
(58) Field of Search ................. 277/592–596

(56) References Cited

U.S. PATENT DOCUMENTS

| | | | | |
|---|---|---|---|---|
| 4,739,999 A | * | 4/1988 | Ishii et al. | 277/595 |
| 4,836,562 A | * | 6/1989 | Yoshino | 277/595 |
| 5,205,566 A | * | 4/1993 | Ueta et al. | 277/596 |
| 5,286,039 A | * | 2/1994 | Kawaguchi et al. | 277/593 |
| 5,297,807 A | * | 3/1994 | Udagawa | 277/595 |
| 5,449,181 A | * | 9/1995 | Miyaoh | 277/595 |
| 5,618,049 A | * | 4/1997 | Ueta | 277/595 |
| 5,639,101 A | * | 6/1997 | Tanaka et al. | 277/593 |
| 5,791,659 A | | 8/1998 | Takada et al. | |
| 5,863,046 A | * | 1/1999 | Diez et al. | 277/593 |
| 5,876,038 A | * | 3/1999 | Bohm et al. | 277/593 |
| 5,927,724 A | * | 7/1999 | Maschmann et al. | 277/593 |
| 6,148,516 A | | 11/2000 | Diez et al. | |
| 6,168,167 B1 | * | 1/2001 | Aoki | 277/595 |
| 6,220,606 B1 | * | 4/2001 | Kawaguchi et al. | 277/595 |
| 6,328,314 B1 | * | 12/2001 | Jinno et al. | 277/593 |
| 6,450,504 B2 | * | 9/2002 | Bleidt et al. | 277/592 |

FOREIGN PATENT DOCUMENTS

| | | |
|---|---|---|
| DE | 195 20 695 A1 | 7/1996 |
| DE | 196 38 682 A1 | 4/1997 |
| DE | 197 49 054 | 6/1999 |
| DE | 198 29 058.6 | 1/2000 |
| DE | 199 02 394 A1 | 8/2000 |
| DE | 199 28 601.9 | 12/2000 |
| DE | 199 28 580.2 | 2/2001 |
| EP | 0 721 077 | 7/1996 |
| EP | 0 853 204 | 7/1998 |
| EP | 0 982 517 | 3/2000 |

OTHER PUBLICATIONS

International Search Report, 4 pages.

* cited by examiner

Primary Examiner—Alison K. Pickard
(74) Attorney, Agent, or Firm—Rader, Fishman & Grauer PLLC

(57) ABSTRACT

The present invention relates to a multi-layered steel gasket, for example a cylinder head gasket, having at least one through opening, for example for a combustion chamber of an internal combustion engine, in which at least three active metallic gasket layers are disposed one above the other; beads being formed in at least two gasket layers around the through opening(s); and a first bead-shaped, plastically deformable deformation limiter being disposed in a spacer sheet, which is disposed between these two gasket layers, on the side adjacent to the beads.

7 Claims, 3 Drawing Sheets

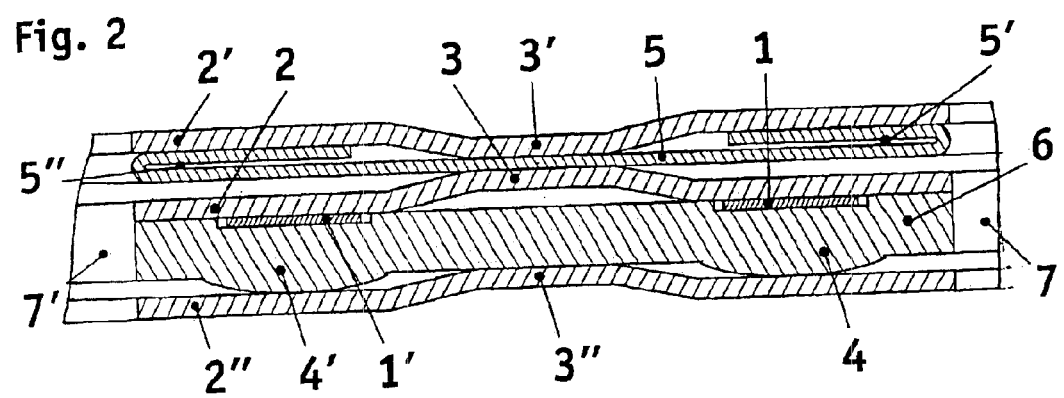

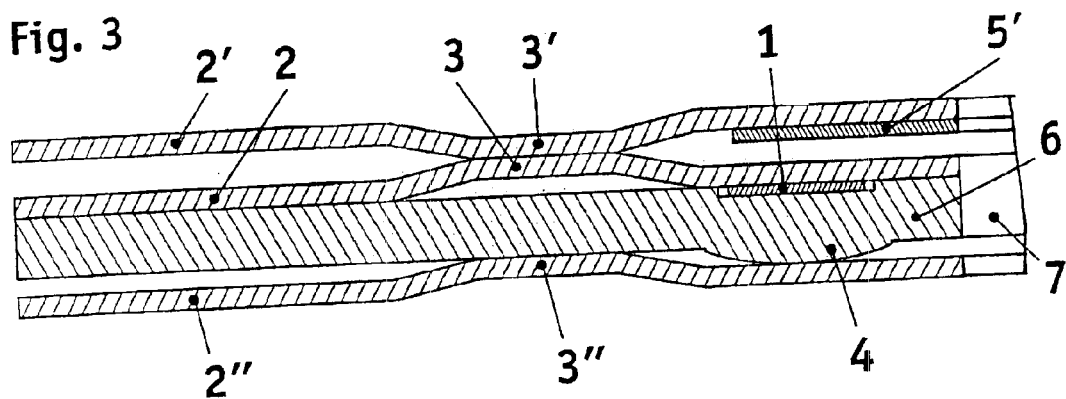

MULTI-LAYERED STEEL GASKET

FIELD OF INVENTION

The invention relates to a multi-layered steel gasket, for example a multi-layered cylinder head gasket, having at least one through-opening, for example for a combustion chamber of an internal combustion engine. In the case of the gasket according to the invention, at least three metallic active gasket layers, which are disposed one above the other, and a spacer sheet between two of the active gasket layers are used. Said gasket is suitable in particular for use in high-performance internal combustion engines, in which increased combustion chamber pressures and consequently also correspondingly increased sealing gap vibrations occur.

BACKGROUND OF THE INVENTION

Multi-layered metal gaskets have been used to date in particular for this field of use. Such a known cylinder head gasket has a sealing design, comprising two active gasket layers, a folded sheet and a spacer sheet in which an omega bead is formed. In the case of such known solutions, the already-mentioned, high sealing gap vibrations which occur in high-performance internal combustion engines with very critical dynamic edge conditions, cannot however be compensated for and a reliable seal of the cylinders between the engine block and cylinder head cannot be achieved. The gaskets used to date cannot ensure a reliable projection at the combustion chamber over a fairly long period of time.

It is therefore the object of the invention to propose a multi-layered steel gasket with which a reliable seal can be achieved in the case of high-performance internal combustion engines with high combustion chamber pressures.

SUMMARY OF THE INVENTION

The multi-layered steel gasket according to the invention, in particular a cylinder head gasket, uses at least three metallic active gasket layers disposed one above the other, beads being formed in at least two of these metallic gasket layers around the one or more through-openings for combustion chambers of internal combustion engines. A spacer sheet is disposed between these two active gasket layers, in which spacer sheet a bead-shaped, plastically deformable deformation limiter (stopper) is formed and disposed at least on one side adjacent to the beads. This stopper enables the gasket to adapt to the engine topography during assembly.

The coating can comprise consequently for example a material which contains a duroplast and at least one metallic filler, the weight range of duroplast to filler being advantageously greater than 1:1. Coating materials of this type are disclosed in DE 198 29 058.6-12. Alternatively, the coating can also comprise a material which contains a perfluorocopolymer, advantageously comprising a perfluorinated alkane and perfluorinated vinyl ether, as is disclosed in DE 199 28 601.9. It is possible to use also as further coating a material which comprises at least one filler and one binder, the mass proportion of the filler being greater than the proportion of binder, and the filler being present in particle form, the individual spherical particles having a small surface in relation to the particle volume. The particles can advantageously have a smoothed, rounded, for example spherical, surface. An ideal size for the particles lies between 5 and 100 $\mu$m. A coating material of this type is disclosed in DE 199 28 580.2.

The space which is formed by the bead on the deformation limiter can be filled with a coating, for example an elastomer. The coating can be effected entirely or only in part. Such a coating, which is normally described also as "Hardcoating", is described for example in DE 198 29 058, DE 199 28 580 and DE 199 28 601, reference being intended to be made to the corresponding disclosure content in its entirety with respect to the coating materials disclosed there.

Due to this hardcoating, in particular in the case of partial filling, the compression of the stopper can be adjusted to a specific degree. As a result, an adequate stopper compression is ensured in the critical inter-screw regions. This filled stopper bead acts then as plastically deformable path limiter for the at least three active functional layers or their beads.

The possibility exists of disposing on one such spacer sheet further likewise bead-shaped, plastically deformable deformation limiters on the corresponding other side of the beads which are formed on the two active gasket layers and also of filling the space there, which has been formed by the bead on the deformation limiter, with the mentioned hardcoating.

The hardcoating can partially but also entirely fill the space and a specific adequate degree of compression can be ensured in the assembled state of the cylinder head gasket in the region of the plastically deformable deformation limiter. The deformation limiter can adapt to the engine topography during assembly by means of its properties and shape. In addition, an adequate compression is ensured in the region of the deformation limiter also in the critical inter-screw regions.

The third active gasket layer can be formed without beads, but preferably also with beads, around the through-openings for combustion chambers.

Between two of the active gasket layers, a further stopper (deformation limiter) can be disposed, preferably in the region between the beads of the active layers and the circumferential edge of the through-opening. Said stopper can be formed by a further sheet layer with a deformation limiter, which sheet layer is disposed between two layers of the gasket and is folded over at its edge towards the through-opening. The deformation limiter is then formed by the folded two-layer part of this sheet. By means of corresponding double foldings, two deformation limiters can be present, those on both sides adjacent to the respective beads which are formed in the active gasket sheets.

This stopper can however be formed also by a ring, for example a sheet metal ring which is disposed in the region between the beads of the adjacent active layers and the circumferential edge of the through-opening.

The beads formed in the active gasket layers should be disposed preferably as a bead packet one above the other.

With the multi-layered construction according to the invention, the sealing gap vibrations can be distributed to the at least three active gasket layers and an increased service life can be achieved in the case of critical sealing gap vibrations.

The invention is intended to be explained in more detail subsequently with reference to the embodiments.

BRIEF DESCRIPTION OF THE DRAWINGS

There are thereby shown:

FIG. 2 a schematic representation of a region of a further example of a cylinder head gasket according to the invention, having deformation limiters disposed on both sides of the beads;

FIG. 3 a schematic representation of a region of a further example of a cylinder head gasket according to the invention with a stopper ring.

DETAILED DESCRIPTION OF THE INVENTION

Figure 1:
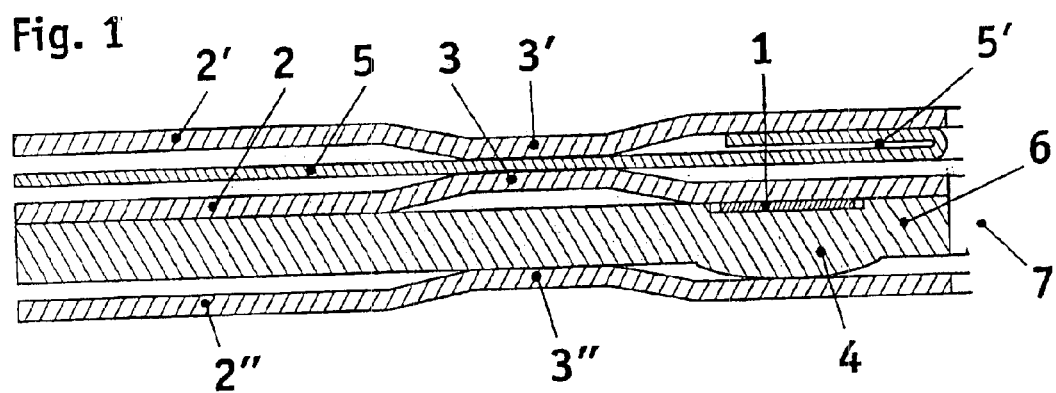
FIG. 1 a schematic representation of a region of an example of a cylinder head gasket according to the invention.

In the example shown in FIG. 1 of a cylinder head gasket according to the invention, three active gasket layers 2, 2', 2" are present disposed one above the other, in which beads 3, 3', 3" respectively are formed. Between the active gasket layer 2" illustrated at the bottom here and the central active gasket layer 2, a spacer sheet 6 is disposed which has a bead-shaped, plastically deformable deformation limiter 4 between the beads 3 and a through-opening 7 for a combustion chamber. The space which is formed by the bead of the deformation limiter 4 on the upper side of the spacer sheet 6 is thereby filled with an elastomer 1 so that, by using the at least two beads 3, 3" in the active gasket sheets 2, 2" and the spacer sheet 6, even in extreme operating conditions, with combustion chamber pressures in the region of 200 bar and beyond, the advantageous technical effects mentioned in the general part of the description and in particular a durable, reliable sealing effect can be achieved.

The beads 3, 3" in the lower and central active gasket layers 2, 2" are deformed in the same direction (same direction). The spacer sheet 6 has a greater thickness than the gasket sheets 2, 2".

Between the upper and the central active gasket layer 2' and 2, a sheet 5 with a folded part forming a further deformation limiter 5' is disposed in this example. The beads 3 and 3' in these two active gasket layers 2, 2' are deformed in respectively oppositely directed directions (opposite direction), i.e. towards each other.

The active gasket layers 2, 2', 2" can be formed from conventional metals with adequate elasticity and in known thicknesses from respectively the same metals, additional coatings being able to be provided also between these active gasket layers 2, 2', 2". The connection of the individual elements of a cylinder head gasket according to the invention can be effected likewise in a conventional manner.

The example of a cylinder head gasket according to the invention shown in FIG. 2 differs from the example according to FIG. 1 merely in the use of additional deformation limiters 4' and 5" which are disposed respectively on the other side, orientated away from the combustion chamber through-opening 7", of the beads 3, 3" configured in the active gasket layers 2, 2", the stability and sealing effect of the cylinder head gasket being able to be further improved in this region with such an arrangement which is required for example between two adjacent combustion chamber through-openings 7, 7'.

FIG. 3 shows a further cylinder head gasket which merely does not have the stopper layer 5 with respect to the cylinder head gasket shown in FIG. 1. The stopper 5' in FIG. 3 corresponding to the folded stopper 5' shown in FIG. 1 is formed by a ring which is disposed in the region between the beads 3, 3' and the circumferential edge of the combustion chamber through-opening 7 between the two gasket layers 2, 2'. By means of an arrangement of this type, a four-layered multi-layered steel gasket is formed in which in addition a stopper ring 5' ensures a sealing line along the circumferential edge of the combustion chamber through-opening 7 between the two active gasket layers 2, 2' and ensures a deformation limitation of the two beads 3, 3' likewise of the two gasket layers 2, 2'. Here as in the preceding Figures, corresponding elements are provided throughout with corresponding reference numbers.

What is claimed is:

1. A multilayered steel gasket comprising:
   at least three active gasket layers each having at least one bead and at least one through-opening; wherein said beads are formed around said through-opening;
   a spacer sheet having a first bead-shaped plastically deformable deformation limiter; wherein said active gasket layers are disposed one above the other, and wherein said spacer sheet is disposed between two of said active gasket layers such that said first deformation limiter is adjacent to one of said at least one bead; and
   a sheet layer having a second deformation limiter, wherein said sheet layer is disposed between at least two of said active gasket layers, and wherein said second deformation limiter is disposed adjacent to said beads.

2. A multilayered gasket according to claim 1, wherein said second deformation limiter comprises at least one fold adjacent to said through-opening.

3. A multilayered steel gasket comprising:
   at least three active gasket layers each having at least one bead and at least one through-opening; wherein said beads are formed around said through-opening;
   a spacer sheet having a first bead-shaped elastically deformable deformation limiter; wherein said active gasket layers are disposed one above the other, and wherein said spacer sheet is disposed between two of said active gasket layers such that said first deformation limiter is adjacent to one of said at least one bead; and
   a stopper ring forming a third deformation limiter, said stopper ring being disposed between two of said active gasket layers, and between said bead and said through-opening of said active gasket layers.

4. A multilayered gasket according to claim 3, further comprising a bead packet, said bead packet including one of said beads disposed above a second of said beads.

5. A multilayered gasket according to claim 3, wherein said beads are present on two active gasket layers, all deformed in the same direction.

6. A multilayered gasket according to claim 3, wherein a third active gasket layer has a bead deformed in a direction opposite to said beads of said two active gasket layers.

7. A multilayered gasket according to claim 3, wherein said first deformation limiter has a concave side, and wherein said concave side is at least partially filled with a hardcoating.

* * * * *